(12) United States Patent
Hily et al.

(10) Patent No.: US 12,182,417 B2
(45) Date of Patent: Dec. 31, 2024

(54) ADDRESS-RANGE MEMORY MIRRORING IN A COMPUTER SYSTEM, AND RELATED METHODS

(71) Applicant: Ampere Computing LLC, Santa Clara, CA (US)

(72) Inventors: Sebastien Hily, Portland, OR (US); Nagi Aboulenein, King City, OR (US); Matthew Robert Erler, Portland, OR (US); Shivnandan Kaushik, Portland, OR (US); Donald Scott Phillips, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 95 days.

(21) Appl. No.: 17/963,803

(22) Filed: Oct. 11, 2022

(65) Prior Publication Data

US 2023/0176749 A1 Jun. 8, 2023

Related U.S. Application Data

(60) Provisional application No. 63/285,796, filed on Dec. 3, 2021.

(51) Int. Cl.
*G06F 3/06* (2006.01)
(52) U.S. Cl.
CPC .......... *G06F 3/0619* (2013.01); *G06F 3/0659* (2013.01); *G06F 3/0673* (2013.01)
(58) Field of Classification Search
CPC ............. G06F 11/1048; G06F 11/1666; G06F 3/0619; G06F 3/0659; G06F 3/0673
(Continued)

(56) References Cited

U.S. PATENT DOCUMENTS

2009/0193192 A1* 7/2009 Burckhardt ......... G06F 12/0831
  711/124
2018/0188966 A1* 7/2018 Jayakumar .......... G06F 11/2056
(Continued)

OTHER PUBLICATIONS

Corbet, J., "Partial address-space mirroring," LWN.net, Apr. 27, 2016, retrieved from the Internet: [URL: https://lwn.net/Articles/684866/], 3 pages.
(Continued)

*Primary Examiner* — Hashem Farrokh
(74) *Attorney, Agent, or Firm* — Withrow & Terranova, PLLC

(57) ABSTRACT

Address range memory mirroring in a computer system, and related methods and computer-readable media. The computer system includes one or more memory mirror agents that are each configured to be programmed to mirror write data of a write request to a memory address mapped to the memory mirror agent. The memory mirror agent is configured to mirror write data to a redundant memory space in memory if the write memory address is within a programmed memory space to be mirrored by the memory mirror agent. The memory mirror agent can be programmed to perform memory mirroring based on specific address ranges to provide flexibility in controlling and changing the exact memory space of the memory system to be mirrored. If an error is detected in read data in response to a memory read request, the memory mirror agent can retrieve the stored redundant data to maintain data integrity.

19 Claims, 5 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2020/0034230 A1* | 1/2020 | Jeyapaul | ............. G06F 12/0246 |
| 2020/0065203 A1* | 2/2020 | Nguyen | ................ G06F 3/0619 |
| 2022/0197533 A1* | 6/2022 | Marosan | ................ G06F 3/0659 |
| 2022/0374310 A1* | 11/2022 | Veprinsky | ........... G06F 11/1076 |

OTHER PUBLICATIONS

Luck, A. et al., "Address Range Partial Memory Mirroring," Intel Corporation, Jan. 5, 2016, retrieved from the Internet: [URL: https://www.intel.com/content/www/us/en/developer/articles/technical/address-range-partial-memory-mirroring.html#_Toc423963601], 5 pages.

Luck, A. et al., "Address Range Partial Memory Mirroring on Linux*," Nov. 15, 2015, retrieved from the Internet: [URL: https://web.archive.org/web/20220222162534/https://01.org/lkp/blogs/tonyluck/2016/address-range-partial-memory-mirroring-linux], 8 pages.

UEFI, "Advanced Configuration and Power Interface (ACPI) Specification," Version 6.3Jan. 2019, Unified Extensible Firmware Interface (UEFI) Forum, Inc., retrieved from the Internet: [URL: https://uefi.org/sites/default/files/resources/ACPI_6_3_final_Jan30.pdf], 1239 pages.

* cited by examiner

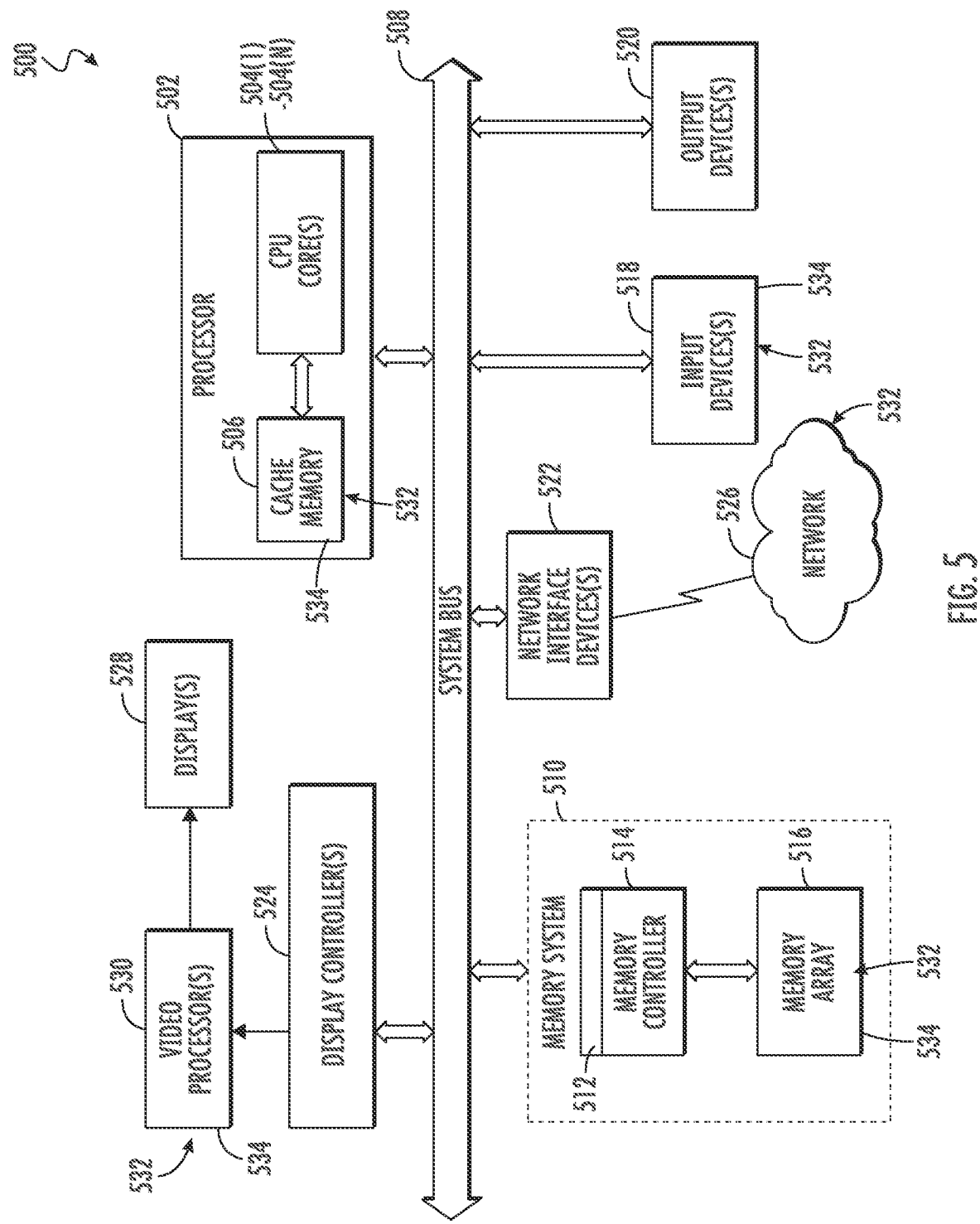

ADDRESS-RANGE MEMORY MIRRORING IN A COMPUTER SYSTEM, AND RELATED METHODS

PRIORITY CLAIM

The present application claims priority to U.S. Provisional Patent Application Ser. No. 63/285,796, filed on Dec. 3, 2021 and entitled "ADDRESS-RANGE MEMORY MIRRORING IN A COMPUTER SYSTEM, AND RELATED METHODS," the contents of which are incorporated herein by reference in its entirety.

FIELD OF THE DISCLOSURE

The technology of the disclosure relates to computing systems that include a central processing unit(s) (CPU(s)) (i.e., processor(s)) and a memory system for storing and accessing data.

BACKGROUND

Computing systems include a central processing unit (CPU), also referred to as a "processor," that includes one or more CPU cores. The CPU cores may conventionally include execution units that receive and execute instructions to perform tasks according to the application of the instructions. A computing system also includes other peripherals, such as cache memory, system memory (e.g., dynamic random access memory (DRAM)), and input/output (I/O interfaces) that are interfaced to access resources needed to execute instructions. For example, a memory read instruction executed by a CPU core causes the CPU core to issue a memory read request to read data from a given memory location in the system memory according to a specified memory address. A CPU core can perform one or more CPU operations using the fetched/read data to generate a produced result. The produced result may then be stored back into the system memory at a specified memory address as a memory write operation as part of the instruction execution.

The reliability of a computer system is dependent on the reliability and integrity of its memory system, as corrupt data in the memory system can result in a CPU executing instructions based on corrupt data, which can generate erroneous results. In another instance, a hardware failure in a part of the memory system may prevent access to the required data. Thus, it may be desired to provide for the ability of a computer system to maintain a redundant copy of data in its memory address space as a way of providing higher reliability and integrity. For example, a computer system can be designed with sufficient memory resources to fully duplicate its memory address space. When data is written, a duplicate copy will also be written in a mirror redundant space. However, this is costly in terms of memory resources as only half of the physically implemented memory will be available for computation. Also, because each write operation will result in writing data to memory twice—once in primary memory and once in redundant memory, the write bandwidth consumed by write operations is doubled.

SUMMARY

Aspects disclosed herein include address-range memory mirroring in a computer system. Related methods and computer-readable media are also disclosed. In exemplary aspects, to increase the integrity of data stored in a memory system in the computer system and available in the addressable memory space of a processor, the computer system also includes one or more memory mirror agents. The memory mirror agents can be a circuit, controller, or processor as examples. The memory mirror agent(s) is configured to intercept write requests from a processor (e.g., central processing unit (CPU) core within) in a visible memory address space (e.g., addressable by operating system) mapped to the memory mirror agent(s). The memory mirror agent(s) is configured to store write data of the write request in a primary memory space in its associated memory allocated in the memory system for the primary storage of data. The memory mirror agent is also configured to store a redundant copy of the write data of the write request in a redundant or backup memory space in its associated memory allocated in the memory system for storing redundant write data. To avoid halving the available memory space in the memory system by always redundantly storing write data for every write request, the memory mirror agent(s) is configured to be programmed to only mirror write data of a write request in a redundant memory space of the memory system if the write memory address of the write request is within a programmed memory space to be mirrored. The memory mirror agent(s) can be configured and reconfigured to identify a subset of memory space (e.g., memory address ranges) of the memory system to be mirrored. For example, the memory mirror agent may include a set of address range registers that are configured to be programmed to store one or more memory address ranges for which write data to a write memory address in a stored memory address range is mirrored. Thus, if an error (e.g., an error not recoverable by error correction coding (ECC)) is detected on read data in response to a memory read request, the memory mirror agent(s) can retrieve the redundant data stored for the read memory address of the memory read request to provide to the requesting CPU to maintain data integrity.

In this manner, the memory mirror agent(s) being programmable to perform memory mirroring based on specific, programmed memory address ranges provides flexibility in the computer system to control and change the exact memory space of the memory system to be mirrored, as needed or desired. For example, some memory address space in the memory system may be allocated to store more critical data than other memory space. The memory mirror agent(s) can be configured to mirror this critical memory space to the exclusion of other less critical memory space. Thus, data integrity of the computer system can be improved and enhanced, but without having to necessarily halve available memory resources and increase the overall memory write bandwidth of the computer system by a factor of two (2). Note that if desired, a memory mirror agent can be programmed to mirror all visible memory address space. As one non-limiting example, to mirror the entire visible memory address space of the memory system, the entire visible memory address range could be programmed in an address range register for the memory mirror agent(s). As another alternative to mirror the entire visible memory address space, the memory mirror agent(s) could be configured with an address range override register that can be programmed to indicate that the address ranges stored in the address range registers are to be ignored and all visible memory address space to be mirrored. As another option, the memory mirror agent(s) could be configured with an override register that can be programmed to indicate an override to the address ranges stored in the address range registers to not mirror any visible memory address space.

In one exemplary aspect, the memory mirror agent is located in the memory system of the computer system to receive write requests at a lower level after the last level cache memory. For example, the memory mirror agent may be located in a memory controller unit (MCU) of a memory system. The MCU may be provided in a separate circuit block (e.g., a chiplet) from the CPU chip. The MCU is a controller circuit that interfaces with an internal bus in the CPU to receive read and write requests and to interface to memory to read data from and write data to memory. It may be desired to include the memory mirror agent in the MCU, because the MCU has direct channel access to memory chips that provide memory storage for the memory system. For example, the MCU may be designed to include dedicated memory controllers that are coupled to dedicated memory chips and assigned to dedicated memory space. In this regard, the MCU includes dedicated memory channels to the dedicated memory controllers that would be accessible to the memory mirror agent. Traffic associated with memory mirroring would not have to be placed on a system bus and/or in the computer system network that could otherwise decrease efficiency and increase network traffic/bandwidth. Thus, the memory mirror agent can be interfaced between an external interface to the MCU and these dedicated memory channels to directly control the memory channels of the MCU. For example, it may be desired to only mirror a subset of memory chips in the memory system, such that a memory mirror agent only has to be associated with the MCUs that are coupled to the dedicated memory chips that can include mirroring.

In one exemplary aspect, in response to a write request, the memory mirror agent issues a write request over a first memory channel as a primary memory channel assigned to the memory address range(s) of the write memory address of the write request. Also in response to the write request, if the write memory address of the write request falls within a prescribed memory address range for mirroring, the memory mirror agent can also inject a write request into a second memory channel as a secondary memory channel assigned for mirroring for the write memory address of the write request. This causes the write data for the write request to be redundantly and transparently written as redundant write data to memory assigned to the second memory channel. The mirroring of data falling within a prescribed memory address range for mirroring can be performed by the memory mirror agent without any requirement to be managed by the processor and/or internal buses or resources (e.g., a mesh network) coupling the processor to the memory system. In other words, the memory mirroring functionality of the computer system can be "offloaded" onto the MCU to improve overall CPU performance, avoid mesh traffic increase due to mirroring, and mitigate any increased memory access latency from mirroring.

In another exemplary aspect, the memory system of the computer system is designed so that separate memory chips are provided for the storage of primary and/or redundant data. For example, the memory system may include dynamic random access memory (DRAM) chips each coupled to respective dedicated physical memory channels. Each DRAM chip is assigned to store primary or redundant data based on the particular visible address of a write request, according to the designation of whether their dedicated memory channels are configured to carry primary or redundant memory for the particularly visible address range(s) by the memory mirror agent. In one example, if desired, the memory mirror agent can configure all of the memory space on a given memory chip to store either primary or redundant write data, with its other paired memory chip storing its complementary redundant or primary write data.

In another exemplary aspect, in another mirroring mode, the MCU can be configured to not perform memory mirroring wherein memory write requests are not replicated to a secondary memory channel to be written redundantly as redundant write data. This is a mirror mode that can be provided in addition to the mirror mode discussed above where data is replicated redundant to memory space based on its memory write address.

In another exemplary aspect, in a recovery mirroring mode, if an error is discovered on a particular memory channel (e.g., first or second memory channel) of a MCU, the memory mirror agent can be configured to stop issuing memory write requests having memory write addresses in a prescribed range for mirroring on the memory channel having an error such that duplication of write data is not performed. The memory mirror agent can be configured to direct memory traffic for such memory write requests to other memory channels (e.g., second or first memory channel) not having an error until the memory channel having the fault and/or its associated memory is recovered from the error and/or after the computer system recovers from shut down/reset operation. In this example, memory read and write requests will be issued on the other memory channel that does not have an error. For example, if the first memory channel has an error, the MCU can be configured to only issue memory write requests having a memory write address within a prescribed memory range for mirroring on the second memory channel. As another example, if the second memory channel has an error, the MCU can be configured to only issue memory write requests having a memory write address within a prescribed memory range for mirroring on the first memory channel. As another example, if a memory channel has a fault, and a memory write request has a memory write address falling within a prescribed memory address range for mirroring, data faults are simply returned for memory write requests assigned to a memory channel having a fault.

In another exemplary aspect, if an error (e.g., an error not recoverable by error correction coding (ECC)) is detected on read data in response to a memory read request that is designated for mirroring, the memory mirror agent can switch (either immediately or after a certain numbers of errors occur) to a non-mirrored mode to discontinue memory mirroring until the error is corrected and/or the computer system is recovered from a shut down/reset operation.

In this regard, in one exemplary aspect, a computer system is provided. The computer system comprises one or more mirror address range registers each configured to store a memory address range. The computer system also includes a first memory channel and a second memory channel. The computer system also comprises a memory mirror agent coupled to the first and second memory channels. The memory mirror agent is coupled to the first and second memory channels and is configured to receive a write request. The write request comprises a write memory address and write data. The memory mirror agent is configured to determine if the write memory address of the write request is within a memory address range stored in any of the one or more mirror address range registers. The memory mirror agent is also configured to communicate the write data of the write request to a first memory channel mapped as a primary memory channel to the write memory address, to be written as primary write data to at least one memory chip coupled to the first memory channel. In response to determining the write memory address of the write request is within a memory address range stored in any of the one or more mirror address range registers, the memory mirror agent is further configured to communicate the write data of the write request to a second memory channel mapped as a secondary memory channel to the write memory address, to be written as redundant write data to at least one memory chip coupled to the secondary memory channel.

In another exemplary aspect, a method of performing address range memory mirroring in a computer system is provided. The method comprises receiving a write request comprising a write memory address and write data. The method also comprises determining if the write memory address of the write request is within a memory address range stored in any of one or more mirror address range registers each configured to store a memory address range. The method also comprises communicating the write data of the write request to a first memory channel mapped as a primary memory channel to the write memory address, to be written as primary write data to at least one memory chip coupled to the first memory channel. The method also comprises, in response to determining the write memory address of the write request is within a memory address range stored in any of the one or more mirror address range registers, communicating the write data of the write request to a second memory channel mapped as a secondary memory channel to the write memory address, to be written as redundant write data to at least one memory chip coupled to the second memory channel.

In another exemplary aspect, a non-transitory computer-readable medium is provided. The non-transitory computer-readable medium has stored thereon computer executable instructions which, when executed by a processor, cause the processor to receive a write request, the write request comprising a write memory address and write data; determine if the write memory address of the write request is within a memory address range stored in any of one or more mirror address range registers each configured to store a memory address range; communicate the write data of the write request to a first memory channel mapped as a primary memory channel to the write memory address, to be written as primary write data to at least one memory chip coupled to the first memory channel; and in response to determining the write memory address of the write request is within a memory address range stored in any of the one or more mirror address range registers, communicate the write data of the write request to a second memory channel mapped as a secondary memory channel to the write memory address, to be written as redundant write data to at least one memory chip coupled to the secondary memory channel.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 4:
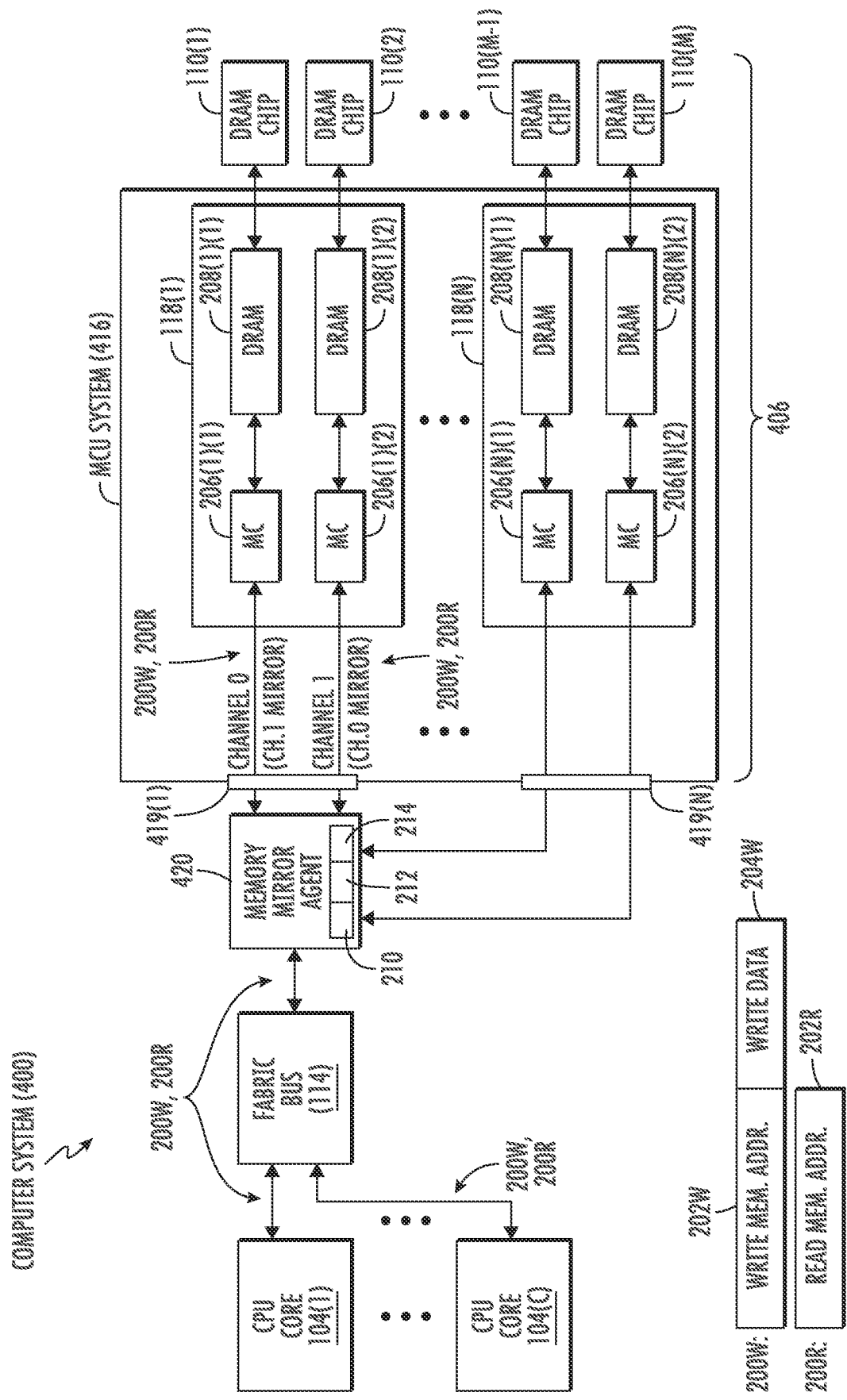

FIG. 4 is a diagram of an alternative exemplary computer system that includes a memory system that includes a MCU system that includes memory channels to dedicated memory chips, and further includes a memory mirror agent outside of the MCU system and interfaced between the MCU system and the processor network to control address range memory mirroring; and FIG. 5 is a block diagram of an exemplary computer system that includes a processor that includes a plurality of CPU cores and peripheral devices and other resources, including a memory system, accessing through an internal coherent fabric bus, wherein the memory system supports address range memory mirroring.

DETAILED DESCRIPTION

Aspects disclosed herein include address-range memory mirroring in a computer system. Related methods and computer-readable media are also disclosed. In exemplary aspects, to increase the integrity of data stored in a memory system in the computer system and available in the addressable memory space of a processor, the computer system also includes one or more memory mirror agents. The memory mirror agents can be a circuit, controller, or processor as examples. The memory mirror agent(s) is configured to intercept write requests from a processor (e.g., central processing unit (CPU) core within) in a visible memory address space (e.g., addressable by operating system) mapped to the memory mirror agent(s). The memory mirror agent(s) is configured to store write data of the write request in a primary memory space in its associated memory allocated in the memory system for the primary storage of data. The memory mirror agent is also configured to store a redundant copy of the write data of the write request in a redundant or backup memory space in its associated memory allocated in the memory system for storing redundant write data. To avoid halving the available memory space in the memory system by always redundantly storing write data for every write request, the memory mirror agent(s) is configured to be programmed to only mirror write data of a write request in a redundant memory space of the memory system if the write memory address of the write request is within a programmed memory space to be mirrored. The memory mirror agent(s) can be configured and reconfigured to identify a subset of memory space (e.g., memory address ranges) of the memory system to be mirrored. For example, the memory mirror agent may include a set of address range registers that are configured to be programmed to store one or more memory address ranges for which write data to a write memory address in a stored memory address range is mirrored. Thus, if an error (e.g., an error not recoverable by error correction coding (ECC)) is detected on read data in response to a memory read request, the memory mirror agent(s) can retrieve the redundant data stored for the read memory address of the memory read request to provide to the requesting CPU to maintain data integrity.

In this manner, the memory mirror agent(s) being programmable to perform memory mirroring based on specific, programmed memory address ranges provides flexibility in the computer system to control and change the exact memory space of the memory system to be mirrored, as needed or desired. For example, some visible memory address space in the memory system may be allocated to store more critical data than other memory space. The memory mirror agent(s) can be configured to mirror this critical memory space to the exclusion of other less critical memory space. Thus, data integrity of the computer system can be improved and enhanced, but without halving available memory resources and increase the overall consumption of memory write bandwidth of the computer system by a factor of two (2).

Note that if desired, a memory mirror agent can be programmed to mirror all visible memory address space. As one non-limiting example, to mirror the entire visible memory address space of the memory system, the entire visible memory address range could be programmed in an address range register for the memory mirror agent(s). As another alternative to mirror the entire visible memory address space, the memory mirror agent(s) could be configured with an address range override register that can be programmed to indicate that the address ranges stored in the address range registers are to be ignored and all visible memory address space to be mirrored. As another option, the memory mirror agent(s) could be configured with an override register that can be programmed to indicate an override to the address ranges stored in the address range registers to not mirror any visible memory address space.

Figure 1:
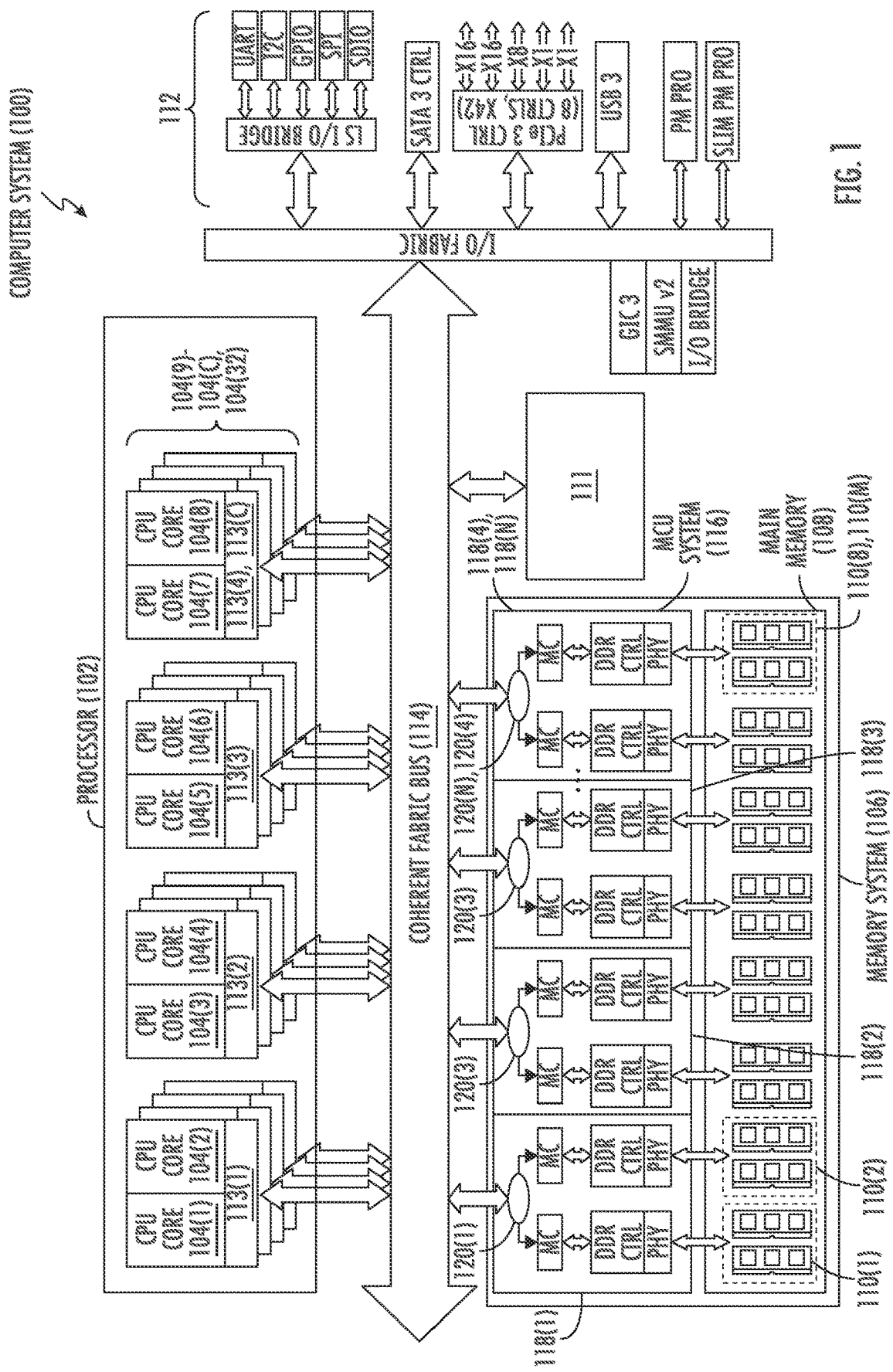
FIG. 1 is a block diagram of an exemplary computer system that includes a processor that includes a plurality of central processing units (CPUs) and peripheral devices and other resources, including a memory system, accessed through an internal coherent fabric bus, wherein the memory system supports address range memory mirroring.

In this regard, FIG. 1 is a block diagram of an exemplary computer system 100 that includes a processor 102 that includes a plurality of CPU cores 104(1)-104(C) (also referred to as just "CPUs") and a memory system 106 for storing data to be accessed by the CPU cores 104(1)-104(C). For example, there may be thirty-two (32) CPU cores 104(1)-104(32) in the processor 102 where 'C' is thirty-two (32). As discussed in more detail below, the memory system 106 supports address range memory mirroring to redundantly store data when written to a main memory 108 of the memory system 106. For example, the main memory 108 may be DRAM that is provided in a series of memory chips 110(1)-110(M) (e.g., DRAM memory chips). For example, there may be sixteen memory chips 110(1)-110(8) in the main memory 108, wherein 'M' is sixteen (8). The computer system 100 includes a cache memory hierarchy that stores data for quick access by the CPU cores 104(1)-104(C). Data written to cache memory may also be written back to main memory 108 through an eviction process in a level 3 cache memory 111 (which may also be referred to as a system-level cache in some aspects). The level 3 cache memory 111 may be a last level cache. Pairs of the CPU cores 104(1)-104(C) each share respective private level 2 cache memory 113(1)-113(C) as part of the cache memory hierarchy. To connect the processor 102 to the system level 3 cache memory 111 and other external peripheral resources 112, the computer system 100 includes a coherent fabric bus 114, also referred to as "network 114". Requests from the processor 102 are communicated over the coherent fabric bus 114 to the destination resource to service such request. For example, for a memory write operation, a CPU core 104(1)-104(C) can write the write data to its private, shared level 2 cache memory 113(1)-113(C). An evicted cache entry in the level 2 cache memory 113(1)-113(C) is chosen to make room for the new write data, and is communicated over the coherent fabric bus 114 to be written to the system level 3 cache memory 111. An evicted cache entry in the level 3 cache memory 111 is chosen to make room for the new write data in the level 3 cache memory 111, and is communicated over the coherent fabric bus 114 to be written to the main memory 108 of the memory system 106.

With continuing reference to FIG. 1, the memory system 106 includes a memory controller unit (MCU) system 116 and main memory 108. The main memory 108 in this example includes memory chips 110(1)-110(8) which may be dynamic random access memory (DRAM) chips as an example. The MCU system 116 includes memory control circuits (MCCs) 118(1)-118(N), wherein in one example, 'N' may be four (4) to include four (4) MCCs 118(1)-118(4). The MCCs 118(1)-118(N) are circuits that provides an interface to respective memory chips 110(1)-110(8) that store data as part of main memory 108 of the memory system 106. In this example, each MCC 118(1)-118(4) includes two (2) memory controllers MC that each interface to a dedicated DDR controller DDR_CTRL to control the interface to a pair of respective memory chips 110(1)-110(8). Each memory controller MC controls a separate, dedicated memory channel to a respective DDR controller DDR_CTRL. The memory controllers MC are circuits that manage the flow of data written to and read from respective memory chips 110(1)-110(8) according to a specified DDR protocol. The DDR controllers DDR_CTRL are circuits that provide a physical interface (PHY) between the memory controllers MC and the respective memory chips 110(1)-110(8).

With continuing reference to FIG. 1, as will be discussed in more detail below, each MCU 118(1)-118(N), 118(4) in the MCU system 116 of the memory system 106 in this example includes a memory mirror agent 120(1)-120(N) that is interfaced either directly or indirectly to the coherent fabric bus 114. The MCCs 118(1)-118(N) are coupled to respective memory channels available from a connection between the MCCs 118(1)-118(N) and the coherent fabric bus 114. In this example, each MCC 118(1)-118(N) includes two memory controllers (MC) that are each coupled to a respective memory channel. The memory mirror agents 120(1)-120(N) are interfaced to the respective MCs in their respective MCCs 118(1)-118(N). The memory mirror agents 120(1)-120(N) are circuits that could consist entirely of hardware circuits or be a controller circuit (e.g., a microcontroller) that can execute firmware and/or software. The memory mirror agents 120(1)-120(N) can be thought of logically as one unit interfacing the coherent fabric bus 114 to the respective MCs in their respective MCCs 118(1)-118(N). However, physical implementation can vary. For example, each memory mirror agent 120(1)-120(N) could be two separate memory mirror circuits that are separately interfaced to a single, respective MC in their respective MCC 118(1)-118(N) and also separately interfaced through a single physical interface that is coupled to the coherent fabric bus 114 with separate memory channels. In this regard, the separate memory mirror circuits provided for the respective memory mirror agents 120(1)-120(N) in each respective MCC 118(1)-118(N) could be configured to interface and communicate with each other to coordinate memory mirroring functions.

Logically, as shown in FIG. 1, each of the four (4) MCCs 118(1)-118(4) have respective memory mirror agents 120(1)-120(4) interfaced directly or indirectly to the coherent fabric bus 114. The memory mirror agents 120(1)-120(N) are each configured to control data over dedicated memory channels coupled to a respective memory controller MC and DDR controller DDR_CTRL. In this example, each memory controller MC and DDR controller DDR-CTRL services a memory channel. Thus, in this example, there are two logical (2) memory channels controlled by the respective memory mirror agents 120(1)-120(4) in each respective MCC 118(1)-118(N). But as noted above, these two memory channels may be separately interfaced to separate memory mirror circuits.

The memory mirror agents 120(1)-120(N) are configured to intercept write requests, such as those initiated by a CPU core 104(1)-104(C) or an eviction from cache memory, in a visible memory address space (i.e., addressable by an operating system) mapped to its respective MCC 118(1)-118(4). For example, the main memory 108 is architected for each MCC 118(1)-118(4) to be memory mapped to specific visible memory address space. As one example, each MCC 118(1)-118(4) may be memory mapped to a contiguous memory address range. As another example, the MCC 118(1)-118(4) may be memory mapped in a parallelized architecture to store bits of data words in parallel with each other. The memory mirror agents 120(1)-120(N) are configured to store write data for a write request in a primary memory space in its associated memory chip 110(1)-110(8) mapped to the memory write address of the write request. The memory mirror agents 120(1)-120(N) are configured to assert the write data of the write request onto a memory channel to be provided to a respective memory controller MC and DDR controller DDR_CTRL for the write data to be written to respective memory chips 110(1)-110(8). To provide for the capability to also store the write data redundantly in the memory system 106, the memory mirror agents 120(1)-120(N) are also configured to store a redundant copy of the write data of the write request in a redundant or backup memory space in its associated memory chips 110(1)-110(8). To avoid halving the available memory space in the system memory 106 by always redundantly storing write data for every write request, the memory mirror agents 120(1)-120(N) are configured in this example to be programmed to only mirror write data of a write request in a redundant memory space of the system memory 106 if the write memory address of the write request is within a programmed memory space to be mirrored. The memory mirror agents 120(1)-120(N) can be configured and reconfigured to identify a subset of its mapped memory space to be mirrored. For example, a memory mirror agent 120(1)-120(N) may include a set of address range registers that are configured to be programmed to store one or more memory address ranges for which write data to a write memory address in a stored memory address range is mirrored. In this manner, the entire addressable memory space mapped to a given MCC 118(1)-118(N) need not be mirrored. If an error (e.g., an error not recoverable by error correction coding (ECC)) is detected on read data in response to a memory read request, the memory mirror agents 120(1)-120(N) can retrieve the redundant write data stored for the read memory address in its interfaced memory chips 110(1)-110(M) of the memory read request to provide to the requesting CPU core 104(1)-104(C) to maintain data integrity.

Figure 2:
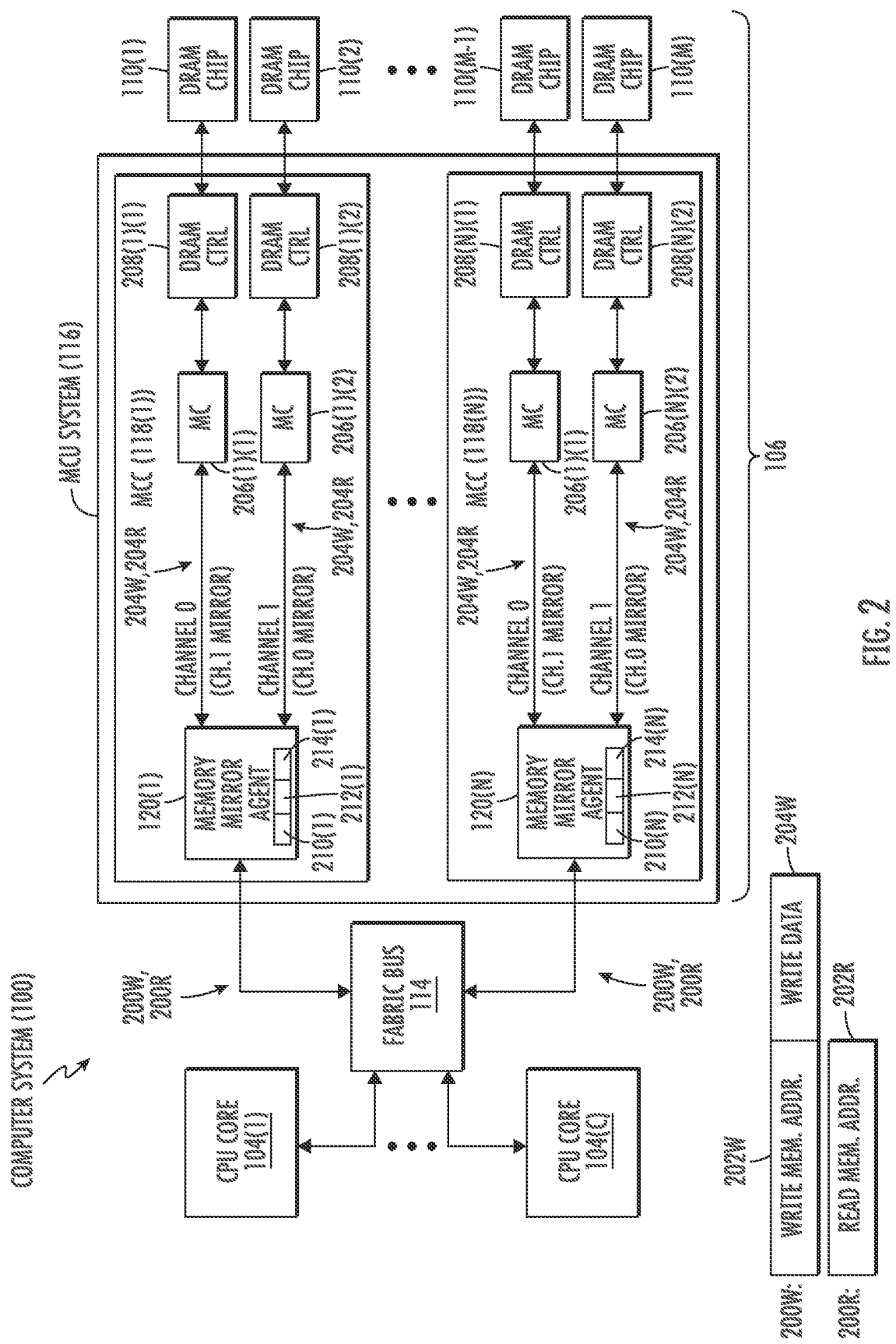
FIG. 2 is another diagram of another exemplary computer system in FIG. 1 that includes a memory system that includes a MCU system having a plurality of memory controller units (MCUs) that each include a memory mirror agent configured to perform address range memory mirroring over memory channels coupled to dedicated memory chips.

FIG. 2 is another block diagram of the exemplary computer system 100 and its MCU system 116 in FIG. 1 to explain further exemplary details of memory mirroring performed by the memory mirror agents 120(1)-120(N) of the MCC 118(1)-118(N) in the MCU system 116. As shown in FIG. 2, the memory mirror agents 120(1)-120(N) receive write and read requests 200W, 200R over the coherent fabric bus 114 from a CPU core 104(1)-104(C). The memory mirror agents 120(1)-120(N) of MCU system 116 receive the write and read requests 200W, 200R to initiate write and read commands to the memory chips 110(1)-110(M) coupled to its respective MCC 118(1)-118(N). In this example, the memory mirror agent 120(1)-120(N) are associated and dedicated to respective MCCs 118(1)-118(N), because the MCCs 118(1)-118(N) have direct channel access to respective memory chips 110(1)-110(M) that provide memory storage for the memory system 106. For example, the MCC may be designed to include dedicated memory controllers that are coupled to dedicated memory chips and assigned to dedicated memory space. In this regard, each MCC 118(1)-118(N) includes dedicated memory channels CHANNEL0, CHANNEL1 accessible to by a respective memory mirror agent 120(1)-120(N) for directing memory traffic for received write and read requests 200W, 200R.

Figure 3:
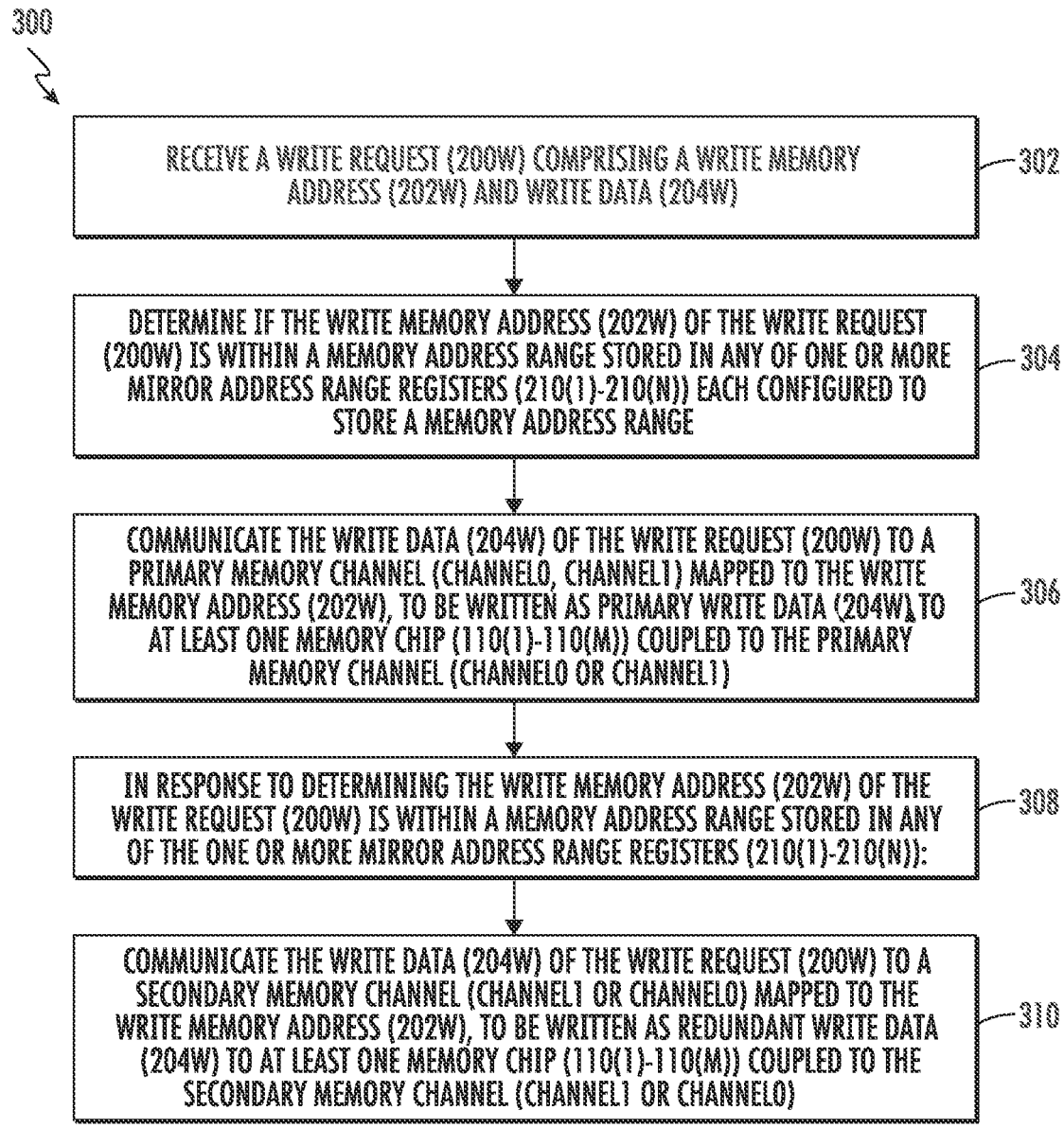
FIG. 3 is a flowchart illustrating the memory mirror agent in the MCU system in FIG. 2 handling a write request that includes address range memory mirroring.

In continuing reference to FIG. 2, a write request 200W issued by a CPU core 104(1)-104(C) is routed by the coherent fabric bus 114 to the MCC 118(1)-118(N) that is mapped to the write memory address 202W of the write request 200W. FIG. 3 is a flowchart that illustrates an example process 300 of a memory mirror agent 120(1)-120(N) processing a write request 200W that will be discussed here in conjunction with FIG. 2.

Assuming that memory mirror agent 120(1) in MCC 118(1) receives the write request 200W as an example, the memory mirror agent 120(1) receives the write request 200W (block 302 in FIG. 3). As examples, the write request 200W can be initiated by a direct request CPU core 104(1)-104(C), or indirectly as a result of a cache eviction, such as from the level 3 cache memory 111 in FIG. 1. The memory mirror agent 120(1) determines if the write memory address 202W of a write request 200W is within a memory address range configured to be mirrored (e.g., stored in any of its mirror address range registers 210(1) (block 304 in FIG. 3)). The memory mirror agent 120(1) communicates the write request 200W with the write data 204W at the write memory address 202W over a first memory channel (CHANNEL0 or CHANNEL1) to write the write data as primary write data to an associated memory chip 110(1), 110(2) (block 306 in FIG. 3). The mapping of which memory channel CHANNEL0 or CHANNEL1 the memory mirror agent 120(1) writes the write data 204W as primary write data is based on the write memory address 202W of the write request 200W. Addresses of visible memory are mapped across all the DRAM chips 110(1)-110(N). Thus, when a write request 200W is initiated by a CPU core 104(1)-104(C), the coherent fabric bus 114 determines to which MCC 118(1)-118(N) to send the write request 200W based on the mapping. This coherent fabric bus 114 also indicates which memory channel CHANNEL0 or CHANNEL1 should carry the write data 204W of the write request 200W to be stored as primary data. The memory mirror agent 120(1) issues the write request 200W to the memory controller MC 206(1)(1) or 206(1)(2) to the memory channel CHANNEL0, CHANNEL1 designated to carry the write data 204W as primary write data, which is in turn communicated to an associated DRAM controller 208(1)(1), 208(1)(2) to be written to an associated memory chip 110(1), 110(2).

In response to determining the write memory address 202W of the write request 200W is within a memory address range stored in any of its mirror address range registers 210(1)-210(N) (block 308 in FIG. 3), the memory mirror agent 120(1) communicates the write data 204W of the write request 200W to a second memory channel (either CHANNEL0 or CHANNEL1 that was not assigned as the primary memory channel for the write request 200W) (block 310 in FIG. 3). In this regard, the memory mirror agent 120(1) (as well as the other memory mirror agents 120(2)-120(N)) include one or more address range registers 210(1) that contains one or more memory address ranges for write requests 200W to be mirrored. The mirror address range registers 210(1)-210(N) can be included in same circuit block of the respective memory mirror agents 120(2)-120(N)) or accessible to the respective memory mirror agents 120(2)-120(N). The mirror address range registers 210(1)-210(N) can be programmed by a CPU core 104(1)-104(C) or other device over the coherent fabric bus 114 as an example with memory address ranges for which write requests 200W are to be mirrored. With reference back to memory mirror agent 120(1), the memory mirror agent 120(1) determines if the write memory address 202W of a write request 200W is within a memory address range stored in any of its mirror address range registers 210(1) (block 304 in FIG. 3). In response to determining the write memory address 202W of the write request 200W is within a memory address range stored in any of its mirror address range registers 210(1) (block 308 in FIG. 3), the memory mirror agent 120(1) communicates the write data 204W of the write request 200W to a second memory channel (either CHANNEL0 or CHANNEL1 that was not assigned as the primary memory channel for the write request 200W) (block 310 in FIG. 3).

As one example, the memory mirror agent 120(1) communicates the write data 204W of the write request 200W to a second memory channel (either CHANNEL0 or CHANNEL1 that was not assigned as the primary memory channel for the write request 200W) (block 310 in FIG. 3) for a new calculated memory address based on the write memory address 202W. This is so that the new calculated memory address maps to a secondary memory channel address for writing the same write data 204W as redundant data over the second memory channel CHANNEL0 or CHANNEL1.

The memory mirror agent 120(1) can switch between the designation of first and second memory channels CHANNEL0 or CHANNEL1 as the primary memory channel or redundant memory channel depending on which memory channel CHANNEL0 or CHANNEL1 is designated as the primary memory channel. The write data 204W is then written redundantly at the write memory address 202W to the memory chip 110(1), 110(2) coupled to the secondary memory channel CHANNEL0, CHANNEL1 (block 310 in FIG. 3). In this example, if the write memory address 202W of the write request 200W is not within a memory address range stored in any of its mirror address range registers 210(1), the memory mirror agent 120(1) does not write the write data 204W redundantly (i.e., "mirror" the write data 204W).

The other memory mirror agents 120(2)-120(N) can operate in the same manner as described above for memory mirror agent 120(1) for processing write requests 200W. Note that in this example, the first and second memory channels CHANNEL0, CHANNEL1 are configured as memory channel pairs to carry primary and redundant write data 204W when the visible memory address range of the write request 200W falls within a prescribed memory address range designated for mirroring. For example, the memory mirror agents 102(1)-102(N) can be configured to inject primary write data 204W for a write request 200W on its first memory channel CHANNEL0 as a primary memory channel for certain memory address ranges of the write memory address 202W and a mirrored, redundant copy of the same write data 204W to its second memory channel CHANNEL1 as a secondary memory channel for the same memory address ranges. The converse is also true. The memory mirror agents 102(1)-102(N) can be configured to inject primary write data 204W for a write request 200W on its second memory channel CHANNEL1 as the primary memory channel for other certain memory address ranges of the write memory address 202W and a mirrored, redundant copy of the same write data 204W to the first memory channel CHANNEL0 as the secondary memory channel for the same other memory address ranges. In other words, the first and second memory channels CHANNEL0, CHANNEL1 can be configured in pairs for a given visible memory address ranges to carry primary and its mirrored, redundant write data 204W, for a given memory address range of the memory write address 202W for storage to respective coupled memory chips 110(1)-110(M). This provides flexibility in the first and second memory channels CHANNEL0, CHANNEL1 being able to be configured or reconfigured to carry primary or redundant write data 204W for a given write request 200W, with the other memory channel CHANNEL1, CHANNEL0 carrying the respective redundant or primary write data 204W for the memory write request 202W as a pairing of such memory channels CHANNEL0, CHANNEL1. In this manner, if one of the memory channels CHANNEL1 or CHANNEL0 incurs a fault, the other non-faulted memory channel CHANNEL0 or CHANNEL1 will have a copy of the data for memory regions in visible memory address space that are covered by memory mirroring as a combination of primary and/or redundant write data.

In this manner, the memory mirror agents 120(1)-120(N) can transparently write the data 202W of a write request 200W redundant to redundant memory in its associated memory chips 110(1)-110(M). The mirroring of write data falling within a prescribed memory address range for mirroring can be performed by the memory mirror agent 120(1)-120(N) without any requirement to be managed by a CPU core 104(1)-104(C), the coherent fabric bus 114 and/or internal buses or resources coupling the processor 102 to the memory system 106. In other words, the memory mirroring functionality of the computer system 100 can be "offloaded" onto the MCU system 116 and its MCCs 118(1)-118(N) for an improved overall CPU performance and to mitigate any increased memory access latency from mirroring.

In this example, the MCCs 118(1)-118(N) include the dedicated memory channels CHANNEL0, CHANNEL1 that are coupled to respective MCs 206(1)(1)-206(N)(M) that are each coupled to dedicated memory chips 110(1)-110(M) depending on the design of the memory system 106. For example, to support memory mirroring, the MCCs 118(1)-118(N) can include one or more memory channels for access a memory chip 110(1)-110(M) configured to store write data and may also include one or more secondary channels for accessing a memory chip 110(1)-110(M) configured to also store write data. The respective memory mirror agents 120(1)-120(N) in the MCCs 118(1)-118(N) can be configured to assign their respective memory channels CHANNEL0, CHANNEL1 in pairs for given memory address ranges to write data as primary and redundant data to their memory chips 110(1)-110(M). The memory chips 110(1)-110(M) can be partitioned in different manners to store data, including the memory space being fully parallelized over all memory chips 110(1)-110(M).

The memory mirror agents 120(1)-120(N) in the MCC 118(1)-118(N) of the MCU system 116 are also configured to receive and process memory read requests 200R to read data from a memory read address 202R. In response to receiving a read request 200R, the memory mirror agents 120(1)-120(N) are configured to communicate the memory read request 202R to a memory channel CHANNEL0, CHANNEL1 mapped to the memory read address 202R as the primary memory channel, to be read as primary read data 204R from an associated memory chip 110(1)-11(N) coupled to the primary memory channel CHANNEL0, CHANNEL1. The read data 204R can then be communicated over the coherent fabric bus 114 back to its requesting CPU core 104(1)-104(C). The memory mirror agents 120(1)-120(N) are configured to determine if the primary read data 204R contains an error. For example, the read data 204R may have an error that is not recoverable by an error correction code (ECC) scheme implemented in the respective MCs 206(1)(1)-206(M)(N) for its respective memory chips 110(1)-110(M). In response to a memory mirror agent 120(1)-120(N) determining that primary read data 204R contains an error, the memory mirror agent 120(1)-120(N) can be configured to disable memory channel CHANNEL0, CHANNEL1 with the error so that data mirroring is disabled until the error is recovered or corrected. The memory mirror agent 120(1)-120(N) can also be configured to retrieve the correct read data 204R from its mirrored memory channel CHANNEL0, CHANNEL1 as the secondary memory channel. The memory mirror agent 120(1)-120(N) can also be configured to stop mirroring and redirect memory read requests 200R and memory write requests 200W or just memory read requests 200R to the secondary memory channel CHANNEL0, CHANNEL1 until the error is resolved or the MCU system 116 re-initiates full memory mirroring again.

Also, the memory mirror agents 120(1)-120(N) in the MCC 118(1)-118(N) of the MCU system 116 in FIG. 2 can be configured to detect an error in its memory channels CHANNEL0, CHANNEL1. In response to detection of an error in a memory channel CHANNEL0, CHANNEL1, the memory mirror agents 120(1)-120(N) can be configured to not communicate write data 204W of a subsequent, next write request 200W to the memory channel CHANNEL0, CHANNEL1 with the error. Instead, the memory mirror agents 120(1)-120(N) can communicate the write data 204W of the write request 200W to the memory channel CHANNEL0, CHANNEL1 that does not have the error, to be written as write data 204W to an associated memory chip 110(1)-110(8) coupled to the memory channel CHANNEL0, CHANNEL1 not having the error. In this manner, the write data 202W is not written to a memory channel CHANNEL0, CHANNEL1 that is known to be corrupt or otherwise have an error. The memory mirror agents 120(1)-120(N) can again start writing write data 204W as either primary or redundant write data for received write requests 200W over a memory channel CHANNEL0, CHANNEL1 that had the error once the memory channel error in the primary memory channel is resolved or recovered, such as through a shut down and/or reset of the computer system 100 as examples.

Further, it may be desired to provide a convenient mechanism to override address range mirroring of write data 204W by the memory mirror agents 120(1)-120(N) so that all write data 204W for all received write requests 200W is mirrored, and not just if the write request 200W has a memory write address 202W falling withing a prescribed memory address range for mirroring. This would in effect halve the available memory space in the memory system 106. In this regard, the memory mirror agents 120(1)-120(N) may also include or have access to an address range override register 212(1)-212(N) that is configured to store an indicator as to whether to always memory mirror (e.g., indicated by a logic '1' state) or to default to address range memory mirroring (e.g., indicated by a logic '0' state). If a memory mirror agent 120(1)-120(N) determines that address range override register 212(1)-212(N) stores an indicator indicating to always memory mirror, the memory mirror agent 120(1)-120(N) can be configured to always write the write data 204W of a received write request 200W redundantly over the memory channel CHANNEL0, CHANNEL1 designated as the secondary memory channel for the memory write address 202W of the write request 200W rather than checking to determine if the memory write address 202W of the write request 200W is within an address range stored in the respective mirror address range registers 210(1)-210(N).

Further, it may be desired to provide a convenient mechanism to override data mirroring by the memory mirror agents 120(1)-120(N) so that no write data 204W for any write requests 200W is mirrored. In this regard, the memory mirror agents 120(1)-120(N) may also include or have access to a memory mirror override register 214(1)-214(N) that is configured to store an indicator as to whether to override memory mirroring (e.g., indicated by a logic '1' state) or to default to address range memory mirroring (e.g., indicated by a logic '0' state). If a memory mirror agent 120(1)-120(N) determines that memory mirror override register 214(1)-214(N) stores an indicator indicating to override memory mirroring, the memory mirror agent 120(1)-120(N) can be configured to not write the write data 204W of a received write request 200W redundantly over a memory channel CHANNEL0, CHANNEL1 designated as the secondary memory channel for the memory write address 202W of the write request 200W until the override memory mirroring is changed back to default to address range memory mirroring in its associated memory mirror override register 214(1)-214(N).

In another example, in a recovery mirroring mode, if an error is discovered on a particular memory channel CHANNEL0, CHANNEL1, the respective memory mirror agent 102(1)-102(N) can be configured to stop issuing memory write requests 200W having a memory write address 202W in a prescribed range for mirroring on the memory channel CHANNEL0 or CHANNEL1 having an error such that duplication of write data 204W is not performed. The memory mirror agent 102(1)-102(N) can be configured to direct memory traffic for such memory write requests 200W to the other memory channel CHANNEL1 or CHANNEL0 not having an error until the memory channel CHANNEL0 or CHANNEL1 having the fault and/or its associated memory chip 110(1)-110(M) is recovered from the error, and/or after the computer system recovers through shut down/reset operation as non-limiting examples. In this example, memory write requests 200W will be issued on the other memory channel CHANNEL1, CHANNEL0 that does not have an error. For example, if the first memory channel CHANNEL0 has an error, the MCC can be configured to only issue memory write requests 200W having a memory write address 202W within a prescribed memory range for mirroring on the second memory channel CHANNEL1. As another example, if the second memory channel CHANNEL1 has an error, the MCC can be configured to only issue memory write requests 200W having a memory write address 202W within a prescribed memory range for mirroring on the first memory channel CHANNEL0. As another example, if a memory channel CHANNEL0 or CHANNEL1 has a fault, and a memory write request 200W does have a memory write address 202W falling within a prescribed memory address range for mirroring, data faults are simply returned for memory write requests 200W over a memory channel CHANNEL0 or CHANNEL1 having the fault.

In another exemplary aspect, if an error (e.g., an error not recoverable by error correction coding (ECC)) is detected on read data 204R in response to a memory read request 200R that is designated for mirroring, the memory mirror agent 102(1)-102(N) can switch (either immediately or after a certain number of errors occur) to a non-mirrored mode to discontinue memory mirroring until the error is corrected and/or the computer system is recovered from a shut down/reset operation.

FIG. 4 is another diagram of an alternative exemplary computer system 400 that includes a memory system 406 that includes a MCU system 416 that does not include memory mirror agents. Instead, a memory mirror agent 420 is provided outside of the MCU system 416 and shared among all the MCCs 118(1)-118(N) in the MCU system 416. The details regarding the MCCs 118(1)-118(N) described above in the memory system 106 in FIG. 2 can also be applicable to the MCCs 118(1)-118(N) in the memory system 406 in FIG. 4, as noted by common element numbers for common components. In this example, the MCC 118(1)-118(N) in the MCU system 416 have respective external MCC interfaces 419(1)-419(N) that interface a shared, common memory mirror agent 420 to the fabric bus 114. Also, in this example, the memory mirror agent 420 can perform the same functions as the memory mirror agents 120(1)-120(N) in the MCU system 116 in FIG. 2, except that the memory mirror agent 420 in FIG. 4 is configured to communicate all write and read requests 200W, 200R. The memory mirror agent 420 includes an address range register 210, an address range override register 212, and memory mirror override register 214 that can perform the same functions as described above for the individual address range registers 210(1)-210(N), address range override register 212(1)-212(N), and memory mirror override register 214(1)-214(N).

FIG. 5 illustrates an example of a processor-based system 500 that can be the same or similar to the computer systems 100, 400 in FIGS. 1-2 and 4 as examples. The processor-based system 500 includes a processor 502 that includes the CPU cores 504(0)-504(N). The processor 502 has a coupled cache memory 506 for rapid access to temporarily stored data. The processor 502 is coupled to a system bus 508 and can intercouple master and slave devices included in the processor-based system 500. Although not illustrated in FIG. 5, multiple system buses 508 could be provided, wherein each system bus 508 constitutes a different fabric. As is well known, the processor 502 communicates with these other devices by exchanging address, control, and data information over the system bus 508. For example, the processor 502 can communicate memory write and read requests to a memory system 510 as an example of a slave device. The memory system 510 can include one or more memory mirror agents 512 like the memory mirror agents 120(1)-120(N) in FIG. 2 or memory mirror agent 420 in FIG. 4 for performing address-range memory mirroring, including according to any of the aspects described above previously. The memory system 510 includes a memory controller 514 interfaced between the memory mirror agent 512 and a memory array 516 that can be provided in one or more memory chips, such as DRAM chips for storing primary and/or redundant write data.

Other master and slave devices can be connected to the system bus 508. As illustrated in FIG. 5, these devices can include one or more input devices 518, one or more output devices 520, one or more network interface devices 522, and one or more display controllers 524, as examples. The input device(s) 518 can include any type of input device, including, but not limited to, input keys, switches, voice processors, etc. The output device(s) 520 can include any type of output device, including, but not limited to, audio, video, other visual indicators, etc. The network interface device(s) 522 can be any devices configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 522 can be configured to support any type of communications protocol desired The processor 502 may also be configured to access the display controller(s) 524 over the system bus 508 to control information sent to one or more displays 528. The display controller(s) 524 sends information to the display(s) 528 to be displayed via one or more video processors 530, which process the information to be displayed into a format suitable for the display(s) 528. The display(s) 528 can include any type of display, including, but not limited to, a cathode ray tube (CRT), a liquid crystal display (LCD), a plasma display, a light emitting diode (LED) display, etc. The processor 602 and its cache memory 506, the memory system 510, the network 525, the input devices 518 and/or the display controller 528 can include computer instructions 532 that are non-transitory computer-readable media 534 to control the function of the processor 502, the video processor 530 and the mirror memory agent 512 of the memory system 510 as examples. Any of the functionality described above for the mirror memory agent 512 can be as a result of the mirror memory agent 512 and/or other controller in the memory system 510 executing the computer instructions 532.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A computer system, comprising:
   one or more mirror address range registers each configured to store a memory address range;
   a first memory channel and a second memory channel; and
   a memory mirror agent coupled to the first and second memory channels, the memory mirror agent configured to:
      receive a write request comprising a write memory address and write data over a network;
      determine if the write memory address of the write request is within a memory address range stored in any of the one or more mirror address range registers;
      communicate the write data of the write request to a first memory channel mapped as a primary memory channel to the write memory address, to be written as primary write data to at least one memory chip coupled to the first memory channel; and
      in response to determining the write memory address of the write request is within a memory address range stored in any of the one or more mirror address range registers:
         communicate the write data of the write request to a second memory channel mapped as a secondary memory channel to the write memory address, to be written as redundant write data to at least one memory chip coupled to the second memory channel;
   wherein the memory mirror agent is further configured to:
      detect an error in the first memory channel; and
      in response to detection of the error in the first memory channel:
         not communicate next write data of a next write request comprising the next write data and a next write memory address to the first memory channel; and
         communicate the next write data of the write request to the second memory channel to be written as write data to at least one memory chip coupled to the second memory channel; and
      in response to the error in the first memory channel being resolved:
         not communicate the write data to the second memory channel; and
         communicate the write data of the write request to the first memory channel, to be written as write data to at least one memory chip coupled to the second memory channel.

2. The computer system of claim 1, further comprising a memory controller unit (MCU) system comprising a memory control circuit (MCC) comprising:
   an external interface coupled to the network coupled to a central processing unit (CPU);
   the memory mirror agent;
   the first memory channel; and
   the second memory channel;
   the memory mirror agent further configured to receive the write request from the network over the external interface.

3. The computer system of claim 1, further comprising:
   a memory controller unit (MCU) system comprising a memory control circuit (MCC) comprising:
      the first memory channel;
      the second memory channel; and
      an external MCC interface coupled to the first memory channel and the second memory channel;
   the memory mirror agent coupled between the network coupled to a central processing unit (CPU) and the external MCC interface of the MCC; and
   the memory mirror agent further configured to:
      receive the write request over the network;
      communicate the write data the external MCC interface to the primary memory channel to be written as primary write data to at least one memory chip coupled to the primary memory channel; and
      in response to determining the write memory address of the write request is within a memory address range stored in any of the one or more mirror address range registers:
         communicate the write data of the write request to the secondary memory channel to be written as the redundant write data to the at least one memory chip coupled to the secondary memory channel.

4. The computer system of claim 1, wherein the memory mirror agent is further configured to:
receive a read request comprising a read memory address;
communicate the read request to a memory channel among one of the first memory channel and the second memory channel mapped as the primary memory channel to the read memory address, to be read as primary read data from at least one memory chip coupled to the primary memory channel;
receive the primary read data from the primary memory channel;
determine if the primary read data contains an error; and
in response to determining the primary read data contains an error:
disable the primary memory channel among the first and second memory channels mapped as the primary memory channel to the read memory address.

5. The computer system of claim 4, wherein the memory mirror agent is further configured to:
receive a next write request comprising a next write memory address and next write data;
determine if the next write memory address of the next write request is within a memory address range mapped to the disabled primary memory channel; and
in response to determining the next write memory address of the next write is mapped to the disabled primary memory channel, not communicate the next write data to the disabled primary memory channel.

6. The computer system of claim 4, wherein the memory mirror agent is further configured to:
receive a next write request comprising a next write memory address and next write data;
determine if the next write memory address of the next write request is within a memory address range stored in any of the one or more mirror address range registers; and
in response to determining the next write memory address of the next write request is within the memory address range stored in any of the one or more mirror address range registers:
determine if a next secondary memory channel for the next write memory address is mapped to the disabled primary channel; and
in response to determining the next secondary memory channel for the next write memory address is mapped to the disabled primary channel:
not communicate the next write data to the next secondary memory channel.

7. The computer system of claim 1, further configured to program a mirror address range register among the one or more mirror address range registers with a memory address range to mirror.

8. The computer system of claim 1, further comprising:
an address range override register;
the memory mirror agent further configured to:
determine if the address range override register stores an indicator indicating to always memory mirror; and
in response to determining the address range override register stores an indicator indicating to always memory mirror:
communicate the write data of the write request to the secondary memory channel to be written as redundant write data to at least one memory chip coupled to the secondary memory channel.

9. The computer system of claim 1, further comprising:
a memory mirror override register;
the memory mirror agent further configured to:
determine if the memory mirror override register stores an indicator indicating to override memory mirroring; and
in response to determining the memory mirror override register stores an indicator indicating to override of memory mirroring:
not communicate the write data of the write request to the secondary memory channel to be written as redundant write data to the at least one memory chip coupled to the secondary memory channel.

10. The computer system of claim 1, further comprising a memory system comprising the at least one memory chip, the at least one memory chip comprising at least one dynamic random access memory (DRAM) chip.

11. A method of performing address range memory mirroring in a computer system, comprising:
receiving a write request comprising a write memory address and write data;
determining if the write memory address of the write request is within a memory address range stored in any of one or more mirror address range registers each configured to store a memory address range;
communicating the write data of the write request to a first memory channel mapped as a primary memory channel to the write memory address, to be written as primary write data to at least one memory chip coupled to the first memory channel; and
in response to determining the write memory address of the write request is within a memory address range stored in any of the one or more mirror address range registers:
communicating the write data of the write request to a second memory channel mapped as a secondary memory channel to the write memory address, to be written as redundant write data to at least one memory chip coupled to the second memory channel;
detecting an error in the first memory channel; and
in response to detection of the error in the first memory channel;
not communicating next write data of a next write request comprising the next write data and a next write memory address to the first memory channel; and
communicating the next write data of the write request to the second memory channel to be written as write data to at least one memory chip coupled to the second memory channel; and
in response to the error in the first memory channel being resolved:
not communicating the write data to the second memory channel; and
communicating the write data of the write request to the first memory channel, to be written as write data to at least one memory chip coupled to the second memory channel.

12. The method of claim 11, further comprising:
receiving a read request comprising a read memory address;
communicating the read request to a memory channel among one of the first memory channel and the second memory channel mapped as the primary memory channel to the read memory address, to be read as primary read data from at least one memory chip coupled to the primary memory channel;
receiving the primary read data from the primary memory channel;
determining if the primary read data contains an error; and
in response to determining the primary read data contains an error:
disabling the primary memory channel among the first and second memory channels mapped as the primary memory channel to the read memory address.

13. The method of claim 12, further comprising:
receiving a next write request comprising a next write memory address and next write data;
determining if the next write memory address of the next write request is within a memory address range mapped to the disabled primary memory channel; and
in response to determining the next write memory address of the next write is mapped to the disabled primary memory channel, not communicating the next write data to the disabled primary memory channel.

14. The method of claim 12, further comprising:
receiving a next write request comprising a next write memory address and next write data;
determining if the next write memory address of the next write request is within a memory address range stored in any of the one or more mirror address range registers; and
in response to determining the next write memory address of the next write request is within the memory address range stored in any of the one or more mirror address range registers:
determining if a next secondary memory channel for the next write memory address is mapped to the disabled primary channel; and
in response to determining the next secondary memory channel for the next write memory address is mapped to the disabled primary channel:
not communicating the next write data to the next secondary memory channel.

15. The method of claim 11, further comprising programming a mirror address range register among the one or more mirror address range registers with a memory address range to mirror.

16. The method of claim 11, further comprising:
determining if an address range override register stores an indicator indicating to always memory mirror; and
in response to determining the address range override register stores an indicator indicating to always memory mirror:
communicating the write data of the write request to the secondary memory channel to be written as redundant write data to at least one memory chip coupled to the secondary memory channel.

17. The method of claim 11, further comprising:
determine if a memory mirror override register stores an indicator indicating to override memory mirroring; and
in response to determining the memory mirror override register stores an indicator indicating to override of memory mirroring:
not communicating the write data of the write request to the secondary memory channel to be written as redundant write data to the at least one memory chip coupled to the secondary memory channel.

18. A non-transitory computer-readable medium having stored thereon computer executable instructions which, when executed by a processor, cause the processor to:
receive a write request from a central processing unit (CPU), the write request comprising a write memory address and write data;
determine if the write memory address of the write request is within a memory address range stored in any of one or more mirror address range registers each configured to store a memory address range;
communicate the write data of the write request to a first memory channel mapped as a primary memory channel to the write memory address, to be written as primary write data to at least one memory chip coupled to the first memory channel; and
in response to determining the write memory address of the write request is within a memory address range stored in any of the one or more mirror address range registers:
communicate the write data of the write request to a second memory channel mapped as a secondary memory channel to the write memory address, to be written as redundant write data to at least one memory chip coupled to the second memory channel;
detecting an error in the first memory channel; and
in response to detection of the error in the first memory channel:
not communicating next write data of a next write request comprising the next write data and a next write memory address to the first memory channel; and
communicating the next write data of the write request to the second memory channel to be written as write data to at least one memory chip coupled to the second memory channel; and
in response to the error in the first memory channel being resolved:
not communicate the write data to the second memory channel; and
communicate the write data of the write request to the first memory channel, to be written as write data to at least one memory chip coupled to the second memory channel.

19. A computer system, comprising:
one or more mirror address range registers each configured to store a memory address range;
a memory controller unit (MCU) system comprising a memory control circuit (MCC) comprising:
a first memory channel;
a second memory channel; and
an external MCC interface coupled to the first memory channel and the second memory channel;
a memory mirror agent coupled between a network coupled to a central processing unit (CPU) and the external MCC interface of the MCC, the memory mirror agent configured to:
receive a write request comprising a write memory address and write data over the network;
determine if the write memory address of the write request is within a memory address range stored in any of the one or more mirror address range registers;
communicate the write data of the write request through the external MCC interface to a first memory channel mapped as a primary memory channel to the write memory address, to be written as primary write data to at least one memory chip coupled to the first memory channel; and in response to determining the write memory address of the write request is within the memory address range stored in any of the one or more mirror address range registers:

communicate the write data of the write request to a second memory channel mapped as a secondary memory channel to the write memory address, to be written as redundant write data to at least one memory chip coupled to the second memory channel.

\* \* \* \* \*